US012706729B2

(12) United States Patent
Abdelghaffar et al.

(10) Patent No.: US 12,706,729 B2
(45) Date of Patent: Aug. 11, 2026

(54) ASSOCIATION OF SUBBAND FULL DUPLEX CONFIGURATIONS AND BANDWIDTH PARTS

(71) Applicant: QUALCOMM Incorporated, San Diego, CA (US)

(72) Inventors: Muhammad Sayed Khairy Abdelghaffar, San Jose, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 432 days.

(21) Appl. No.: 18/448,770

(22) Filed: Aug. 11, 2023

(65) Prior Publication Data

US 2025/0055657 A1 Feb. 13, 2025

(51) Int. Cl.
*H04B 7/00* (2006.01)
*H04L 5/00* (2006.01)
*H04L 5/14* (2006.01)

(52) U.S. Cl.
CPC .............. *H04L 5/14* (2013.01); *H04L 5/0094* (2013.01)

(58) Field of Classification Search
CPC ......... H04L 5/14; H04L 5/0094; H04L 5/001; H04W 72/0453
See application file for complete search history.

(56) References Cited

U.S. PATENT DOCUMENTS

2023/0163936 A1* 5/2023 Awadin ..................... H04L 5/14 370/329
2023/0224880 A1* 7/2023 Xiong ............... H04W 72/0446 370/329
2023/0276438 A1* 8/2023 Rudolf ................ H04W 52/245
2023/0292294 A1* 9/2023 Rudolf .................. H04L 5/0053
2023/0421222 A1* 12/2023 Chatterjee ............ H04B 7/0626
2024/0057050 A1* 2/2024 Zhang ....................... H04L 5/14
2024/0073911 A1* 2/2024 Abotabl .................... H04L 1/08
2024/0097867 A1* 3/2024 Zhang ................... H04L 5/0058
2024/0107525 A1* 3/2024 Khan Beigi .......... H04L 5/1469

(Continued)

FOREIGN PATENT DOCUMENTS

CN 117320172 A * 12/2023 ........ H04W 72/0453
WO WO-2020175929 A1 * 9/2020 ............ H04W 72/23

(Continued)

OTHER PUBLICATIONS

International Search Report and Written Opinion—PCT/US2024/038083—ISA/EPO—Nov. 8, 2024.

(Continued)

*Primary Examiner* — Thai Dinh Hoang
(74) *Attorney, Agent, or Firm* — Patterson & Sheridan, LLP

(57) ABSTRACT

Certain aspects of the present disclosure provide techniques for association of subband full duplex (SBFD) configurations and bandwidth parts (BWP). An example method, performed at a user equipment (UE), generally includes receiving signaling indicating one or more associations between one or more subband full duplex (SBFD) configurations and one or more bandwidth parts (BWPs), determining whether one of the SBFD configurations is applicable to a first BWP based on the associations, and communicating on the first BWP in accordance with the determination.

20 Claims, 15 Drawing Sheets

(56) References Cited

U.S. PATENT DOCUMENTS

| | | | | |
|---|---|---|---|---|
| 2024/0107545 | A1* | 3/2024 | Zhang | H04L 5/001 |
| 2024/0114500 | A1* | 4/2024 | Abdelghaffar | H04W 74/0808 |
| 2024/0121070 | A1* | 4/2024 | Abdelghaffar | H04W 48/12 |
| 2024/0146490 | A1* | 5/2024 | Zhang | H04L 5/0098 |
| 2024/0154779 | A1* | 5/2024 | Zhou | H04W 72/23 |
| 2024/0155583 | A1* | 5/2024 | Rudolf | H04L 5/14 |
| 2024/0163068 | A1* | 5/2024 | Zhou | H04L 5/14 |
| 2024/0196415 | A1* | 6/2024 | Lee | H04L 5/0094 |
| 2024/0260018 | A1* | 8/2024 | Awadin | H04W 28/26 |
| 2024/0267932 | A1* | 8/2024 | Rudolf | H04W 72/232 |
| 2024/0276462 | A1* | 8/2024 | Mondet | H04W 72/0446 |
| 2024/0276468 | A1* | 8/2024 | Patel | H04L 5/001 |
| 2024/0283625 | A1* | 8/2024 | Abdelghaffar | H04L 5/001 |
| 2024/0357657 | A1* | 10/2024 | Lei | H04W 56/001 |
| 2024/0380565 | A1* | 11/2024 | Abdelghaffar | H04W 72/232 |
| 2024/0381375 | A1* | 11/2024 | Zhou | H04W 72/046 |
| 2025/0055657 | A1* | 2/2025 | Abdelghaffar | H04L 5/14 |
| 2025/0056268 | A1* | 2/2025 | Zhang | H04W 24/08 |

FOREIGN PATENT DOCUMENTS

| | | | | |
|---|---|---|---|---|
| WO | WO-2023172418 A1 * | 9/2023 | | H04W 72/1263 |
| WO | WO-2024030528 A1 * | 2/2024 | | H04W 72/1268 |
| WO | WO-2024064490 A1 * | 3/2024 | | H04W 72/232 |
| WO | 2024072772 A1 | 4/2024 | | |
| WO | WO-2024147612 A1 * | 7/2024 | | H04L 5/0044 |
| WO | WO-2025034644 A1 * | 2/2025 | | H04W 72/04 |

OTHER PUBLICATIONS

Qualcomm Incorporated (Peter Gaal): “Feasibility and Techniques for Subband Non-overlapping Full Duplex”, R1-2305335, 3rd Generation Partnership Project, Mobile Competence Centre, 650, Route Des Lucioles, F-06921 Sophia-antipolis Cedex, France, vol. RAN WG1, No. Incheon, KR, May 22, 2023-May 26, 2023, May 14, 2023, 68 Pages, XP052310773, Sections 2.7, 2.9.

* cited by examiner

One Frame (TDD)
10 ms
400
subframe
RB
slot
subcarrier
OFDM symbol
DMRS $R_x$
CSI-RS 430
PDCCH
SSS
PSS
PDSCH
PBCH
20 RBs
SS/PBCH Block
system bandwidth RBs 450
SRS
SRS Comb 0
SRS Comb 1
DMRS R

480
PUCCH
PUSCH frequency
502
DL
UL
504
time

FIG. 5A frequency
502
DL
UL
504
time

FIG. 5B frequency
DL
502
Guard band
506
UL
504
time

FIG. 5C

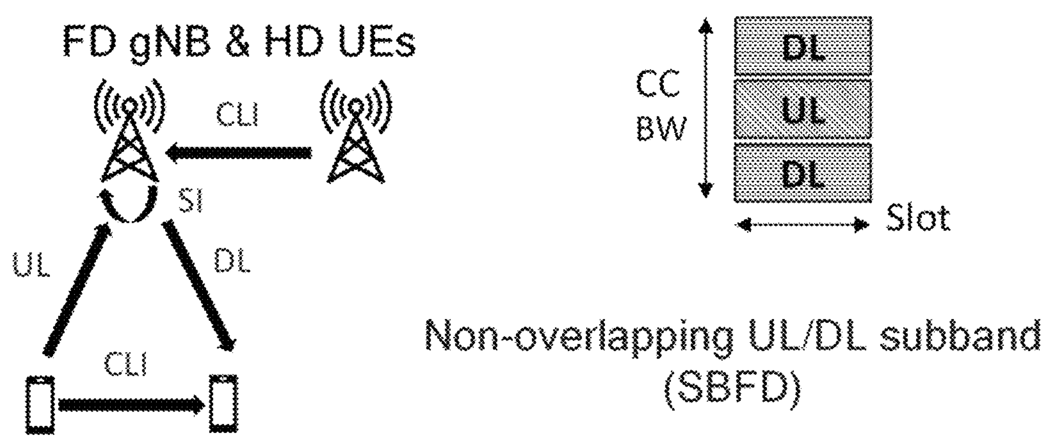
FIG. 6A
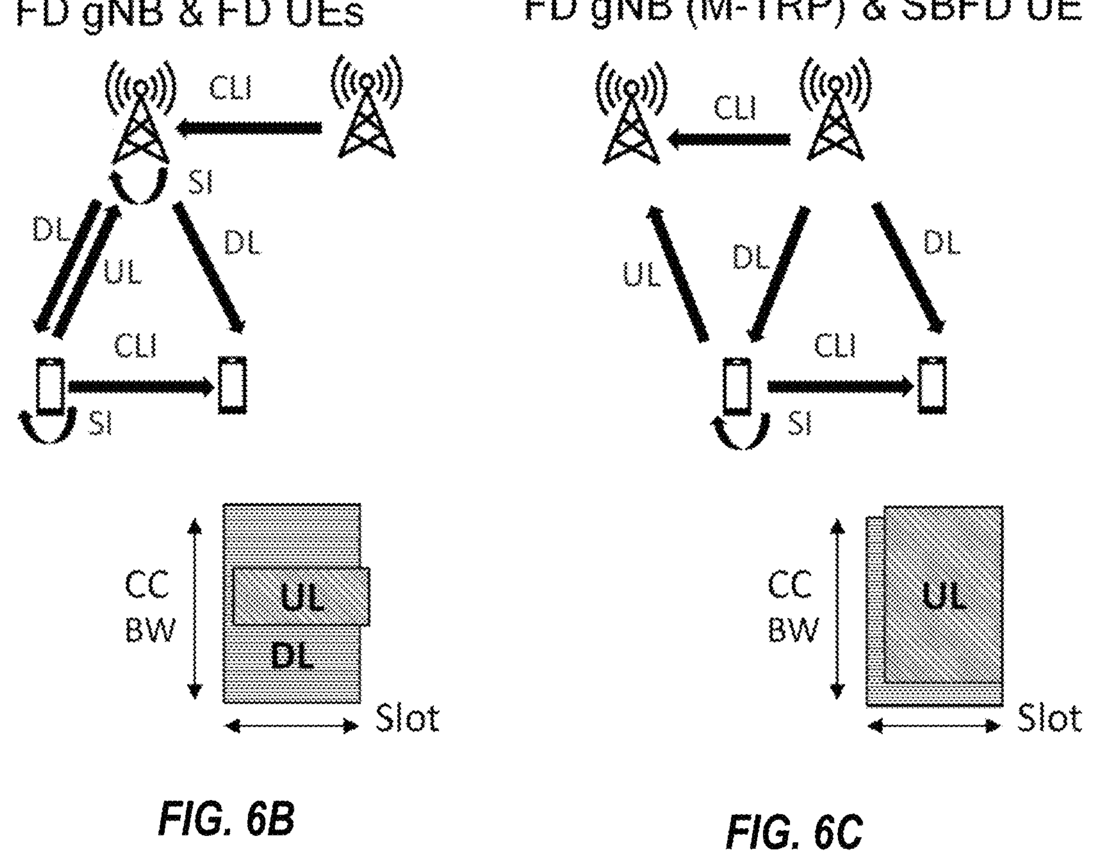
FIG. 6B
FIG. 6C

752 D SB-FD SB-FD SB-FD 754 U

800

Full Duplex (FD) gNB performing simultaneous transmission and reception on the same slot

1100

```
BWP-Downlink ::=    SEQUENCE {
    bwp-Id              BWP-Id,          1102
    bwp-Common          BWP-DownlinkCommon
    bwp-Dedicated       BWP-DownlinkDedicated
    SBFD-schemes        ENUMERATED {enabled}   1104
    ...
}
```

```
BWP-Downlink ::=    SEQUENCE {
    bwp-Id              BWP-Id,                   1202
    bwp-Common          BWP-DownlinkCommon
    bwp-Dedicated       BWP-DownlinkDedicated
    SBFD-schemes        SBFD-configuration_id     1204
    ...
}
```

```
SBFD-configuration ::=    SEQUENCE {
1254 SBFD-configuration_id        SBs-Id,
    UL-subband-locationAndBW      (RIV or RB-set)
    DL-subband_1-locationAndBW    (RIV or RB-set)
    DL-subband_2-locationAndBW    (RIV or RB-set)
    Subband-subbcarrierSpacing
    SBFD_time_locations
}
```

FIG. 12B

ASSOCIATION OF SUBBAND FULL DUPLEX CONFIGURATIONS AND BANDWIDTH PARTS

BACKGROUND

Field of the Disclosure

Aspects of the present disclosure relate to wireless communications, and more particularly, to techniques for enhancing subband full duplex (SBFD) based communications.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes receiving signaling indicating one or more associations between one or more subband full duplex (SBFD) configurations and one or more bandwidth parts (BWPs); determining whether one of the SBFD configurations is applicable to a first BWP based on the associations; and communicating on the first BWP in accordance with the determination.

Another aspect provides a method for wireless communication at a network entity. The method includes transmitting signaling indicating one or more associations between one or more subband full duplex (SBFD) configurations and one or more bandwidth parts (BWPs); determining whether one of the SBFD configurations is applicable to a first BWP based on the associations; and communicating with a user equipment (UE) on the first BWP in accordance with the determination.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5A, 5B, and 5C depict various examples of full duplex (FD) time/frequency resource configurations.

FIGS. 6A, 6B, and 6C depict various examples of full duplex configurations.

FIG. 11 depicts an example bandwidth part (BWP) configuration, in accordance with certain aspects of the present disclosure.

FIG. 12A depicts an example BWP configuration, in accordance with certain aspects of the present disclosure.

FIG. 12B depicts an example SBFD configuration, in accordance with certain aspects of the present disclosure.

DETAILED DESCRIPTION

Figure 1:
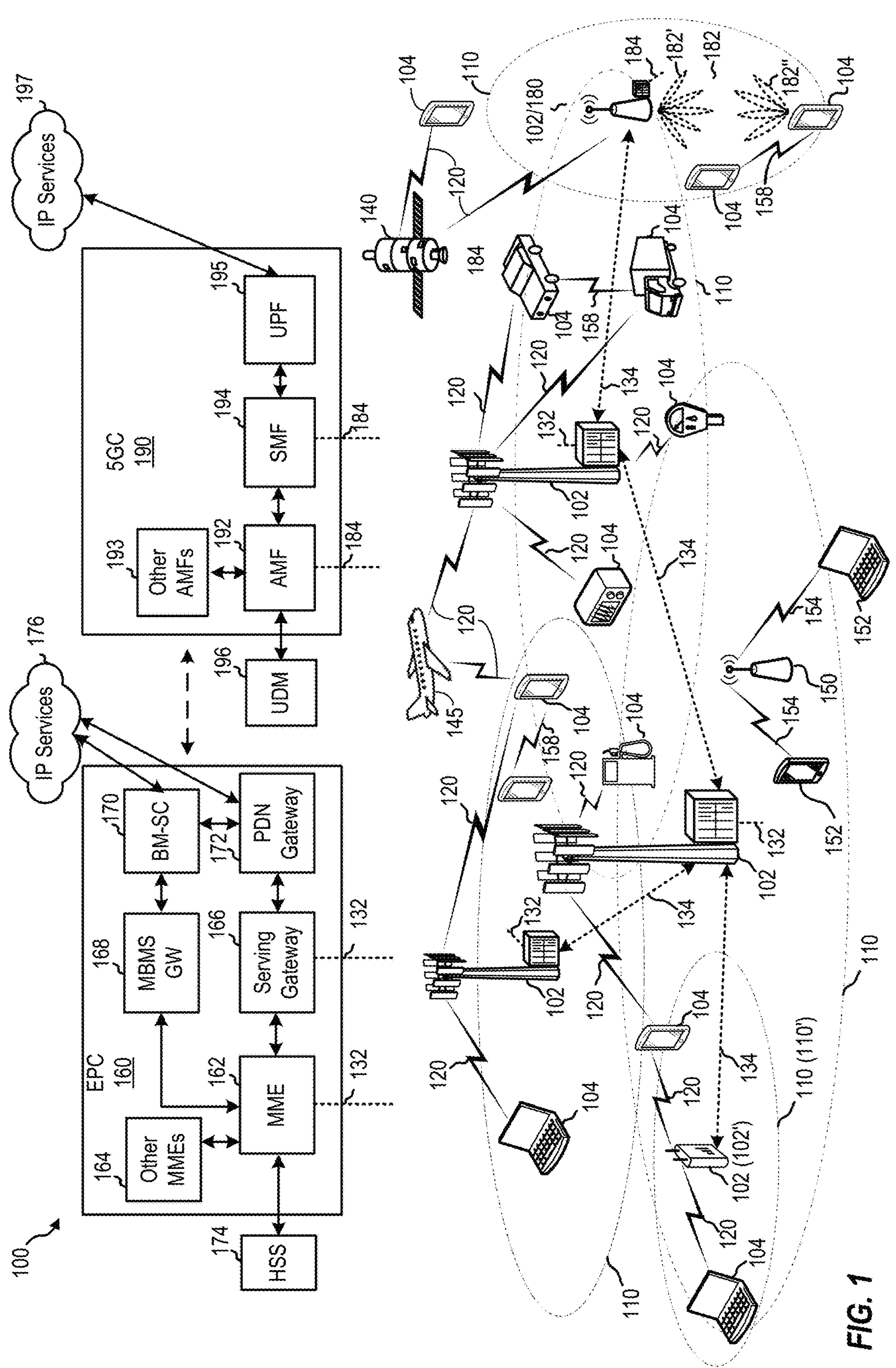
FIG. 1 depicts an example wireless communications network.

Aspects of the present disclosure provide apparatuses, methods, processing systems, and computer-readable mediums for enhancing subband full duplex (SBFD) based communications, for example, by indicating associations between SBFD configurations and bandwidth parts (BWPs).

The term full duplex (FD) generally refers to simultaneous transmission and reception over a wireless medium. An FD device is, thus, capable of processing bi-directional transmissions at the same time. In contrast, a half-duplex (HD) device is only capable of transmitting or receiving, at one time, but not both.

If a user equipment (UE) is operating in HD mode and a network entity, such as a gNodeB (gNB), is operating in an FD mode, such as sub-band FD (SBFD) or in-band FD (IBFD), interference may occur at the UE and gNB from a number of sources. For example, this interference may include inter-cell interference (ICI) from other gNBs, intra-cell cross-link interference (CLI) from UEs in the same cell, and inter-cell CLI from UEs in adjacent cells. Self-interference may also occur for both FD UEs and FD gNBs. In the case of FD gNBs, for example, self-interference may refer to a downlink transmission interfering with reception of an uplink transmission. These sources of interference may cause significant issues, including decreased spectral efficiency, increased power consumption, and poor UE performance.

In SBFD communication, guard bands may be used to separate frequency resources allocated for downlink (DL) and uplink (UL) signaling. In SBFD, the downlink and uplink signals may be transmitted on different subbands within the same frequency band. The guard band is a portion of the spectrum that is not used for either downlink or uplink communication, but is instead reserved to separate the subbands used for downlink and uplink signaling, preventing interference between them and allowing for a more reliable and efficient use of the available spectrum.

SBFD operation is typically associated with relative high power consumption (e.g., for network entities such as gNBs), as it involves digital cancellation schemes and additional hardware (e.g., separate panels for simultaneous transmission and reception). In some scenarios, a network entity may need to reduce its energy consumption, for example, by adapting cell bandwidth, reducing power (e.g., to reduce self-interference), changing antenna configurations (e.g., to reduce jamming) or even turning off SBFD mode. Due to the impact of SBFD on power consumption, a network entity may benefit from having different SBFD configurations for the different gNB network energy savings (NES) modes. For example, a network entity may have different cell bandwidths (e.g. smaller bandwidth to improve energy savings) for different NES modes for SBFD operation.

The UL/DL subband sizes may be different for the different BWPs (e.g. for all BWPs when cell-dependent or each BWP when BWP-dependent). For example, in some cases, a cell's bandwidth, a number of antennas, and/or transmit power may be adjusted for energy savings. In such cases, the interference suppression capability and the impacted bandwidths may be different based on the adjustments. Thus, various features, such as guard band size and DL/UL subband configurations may be different. Alternatively, in some cases, a network entity may decide to turn off SBFD for some or all BWPs to achieve energy savings.

However, when a UE is indicated with one or more SBFD configurations, it may be unclear to the UE whether the SBFD configurations are BWP dependent or not (e.g., if the SBFD configurations are applicable to all UE BWPs or not). Further, if the UE is indicated with multiple SBFD configurations, the associations of the configurations with various BWPs may be unclear. Additionally, it may be unclear to the UE whether the SBFD configurations are serving-cell common or UE-dedicated and whether time and/or frequency configurations are cell-common or UE-dedicated.

Aspects of the present disclosure provide techniques for indicating association of SBFD configurations and BWPs and adaptation of SBFD operations/configurations (e.g., change SBFD configuration or turn SBFD configuration ON/OFF) in one or more BWPs (e.g., based on the associations). Utilization of the techniques disclosed herein may provide improved network energy savings, improved quality of service (QoS), and improved overall system capacity.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
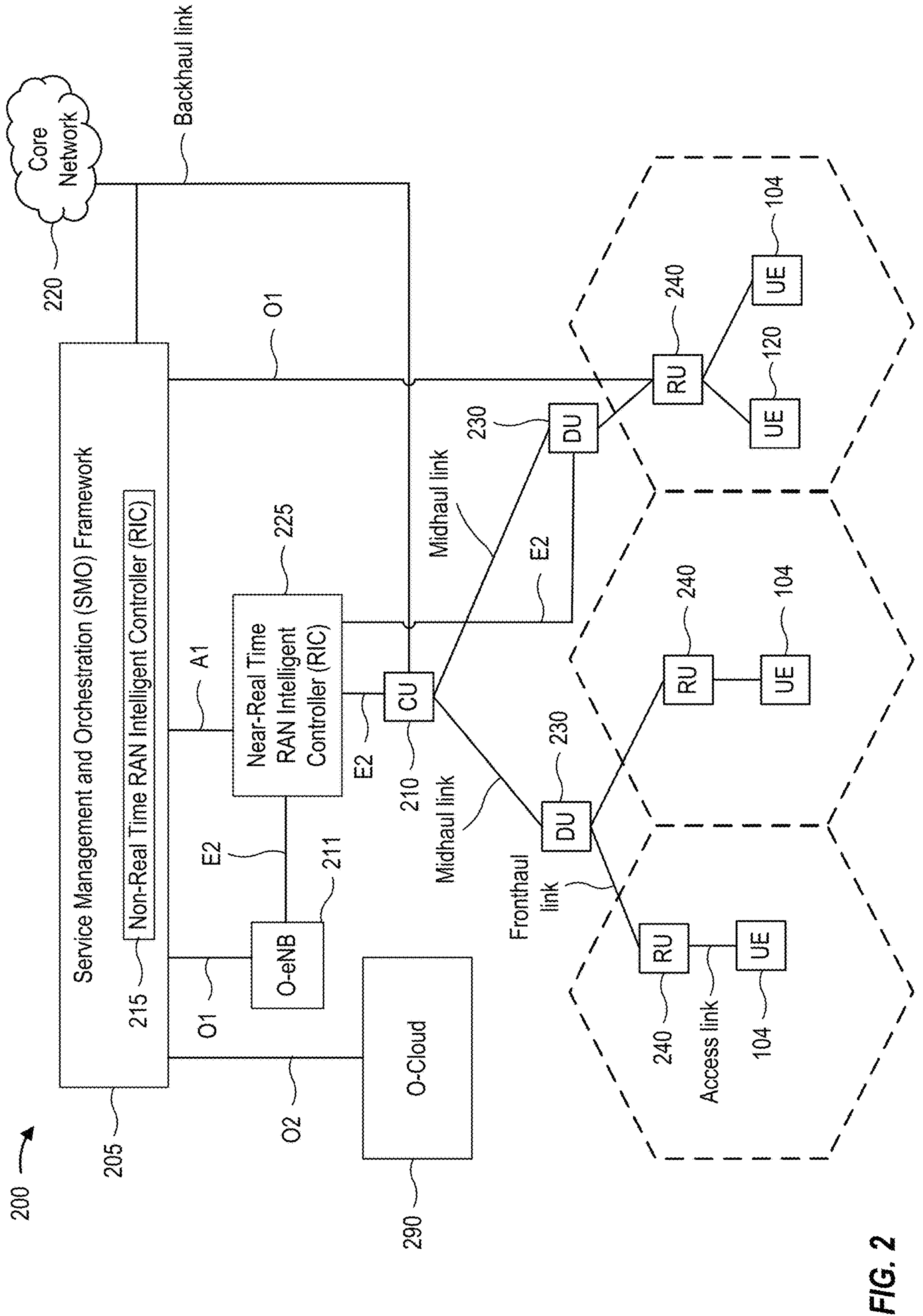
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as “Sub-6 GHz”. Similarly, 3GPP currently defines Frequency Range 2 (FR2) as including 24,250 MHz-52,600 MHz, which is sometimes referred to (interchangeably) as a “millimeter wave” (“mmW” or “mmWave”). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
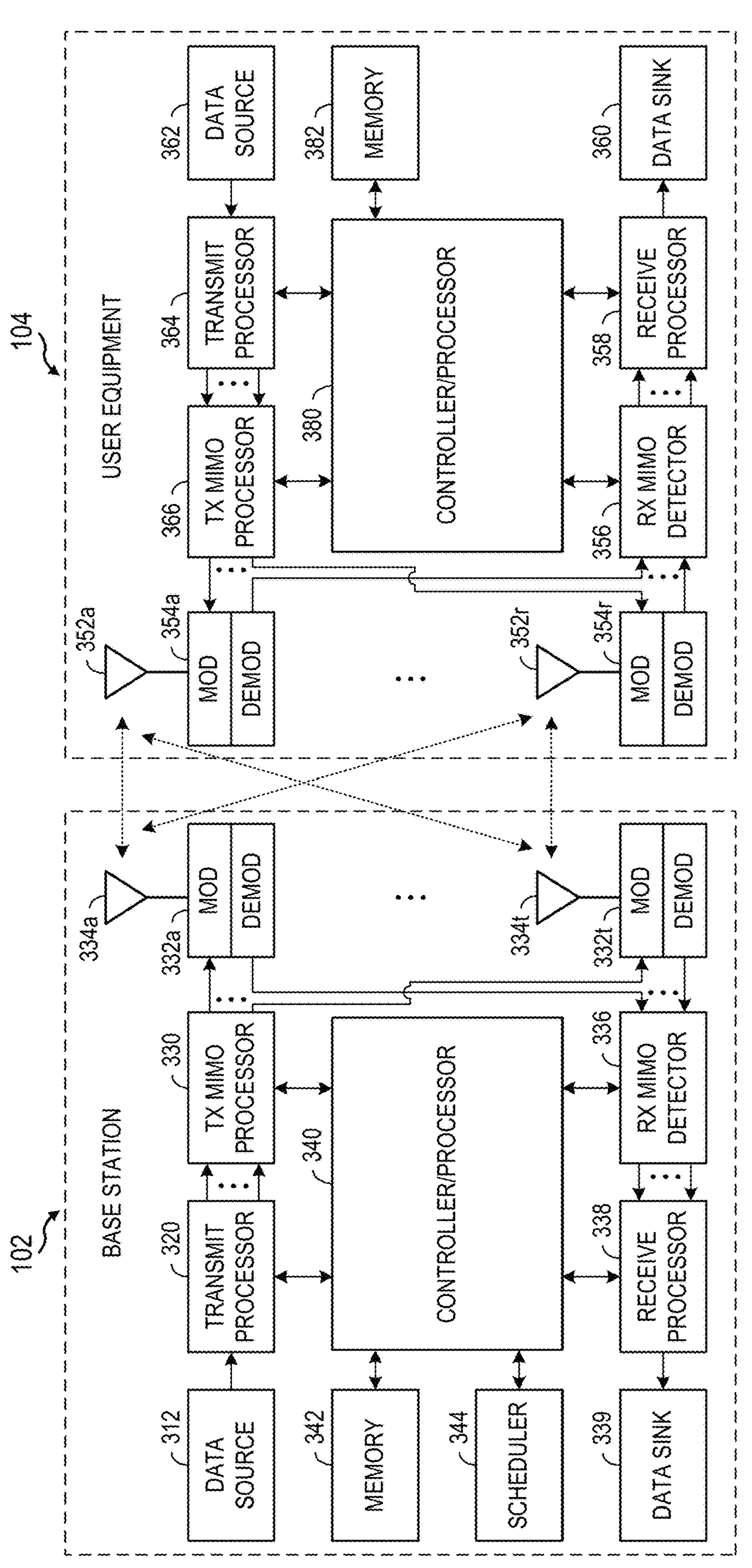
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
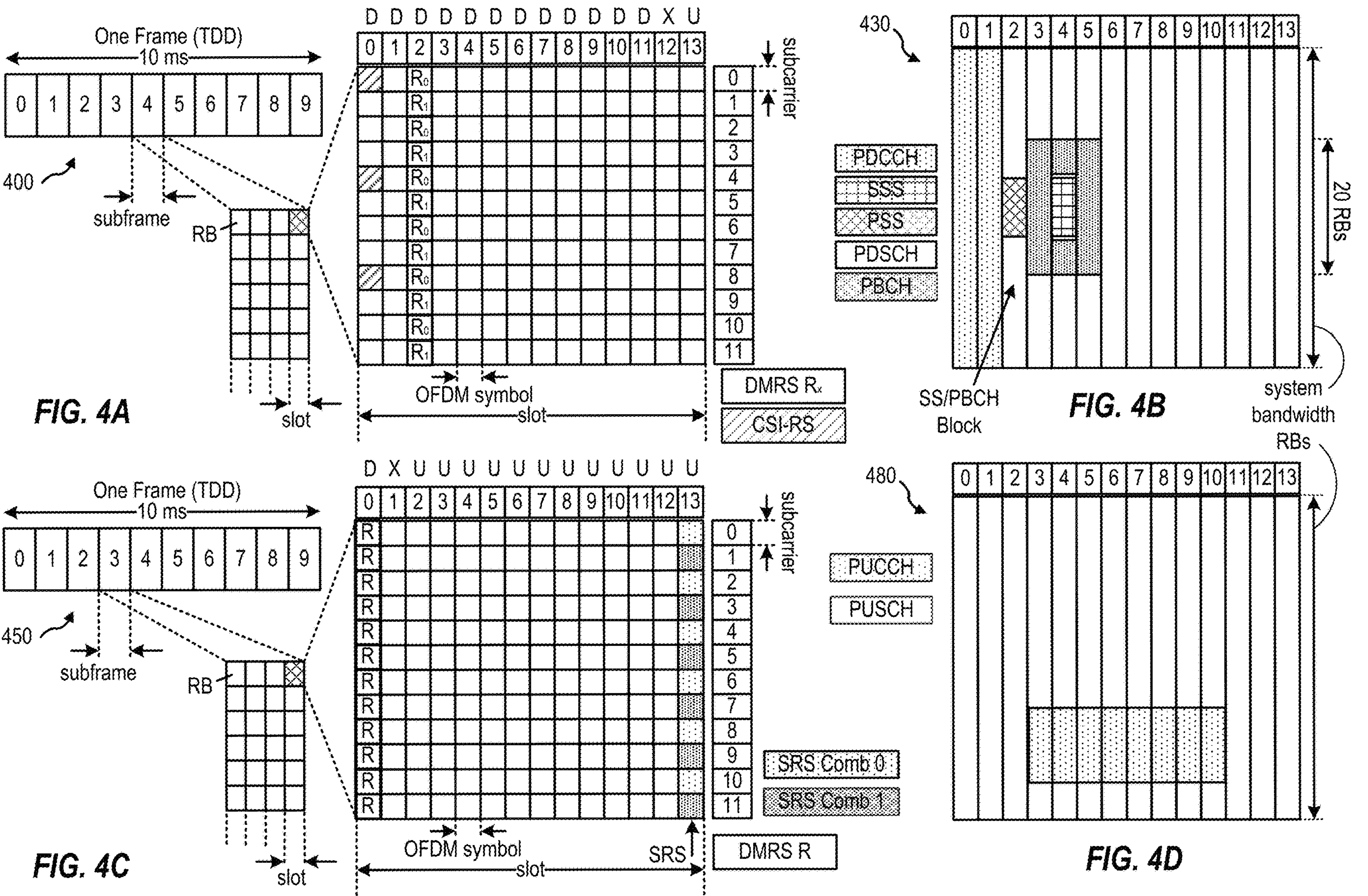
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}\times15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full Duplex Communication

As noted above, a full-duplex (FD) device is capable of simultaneous bi-directional communications. In contrast, half-duplex (HD) devices are only capable of communications in one direction (transmit or receive) at one time.

Figures 5A, 5B, 5C:
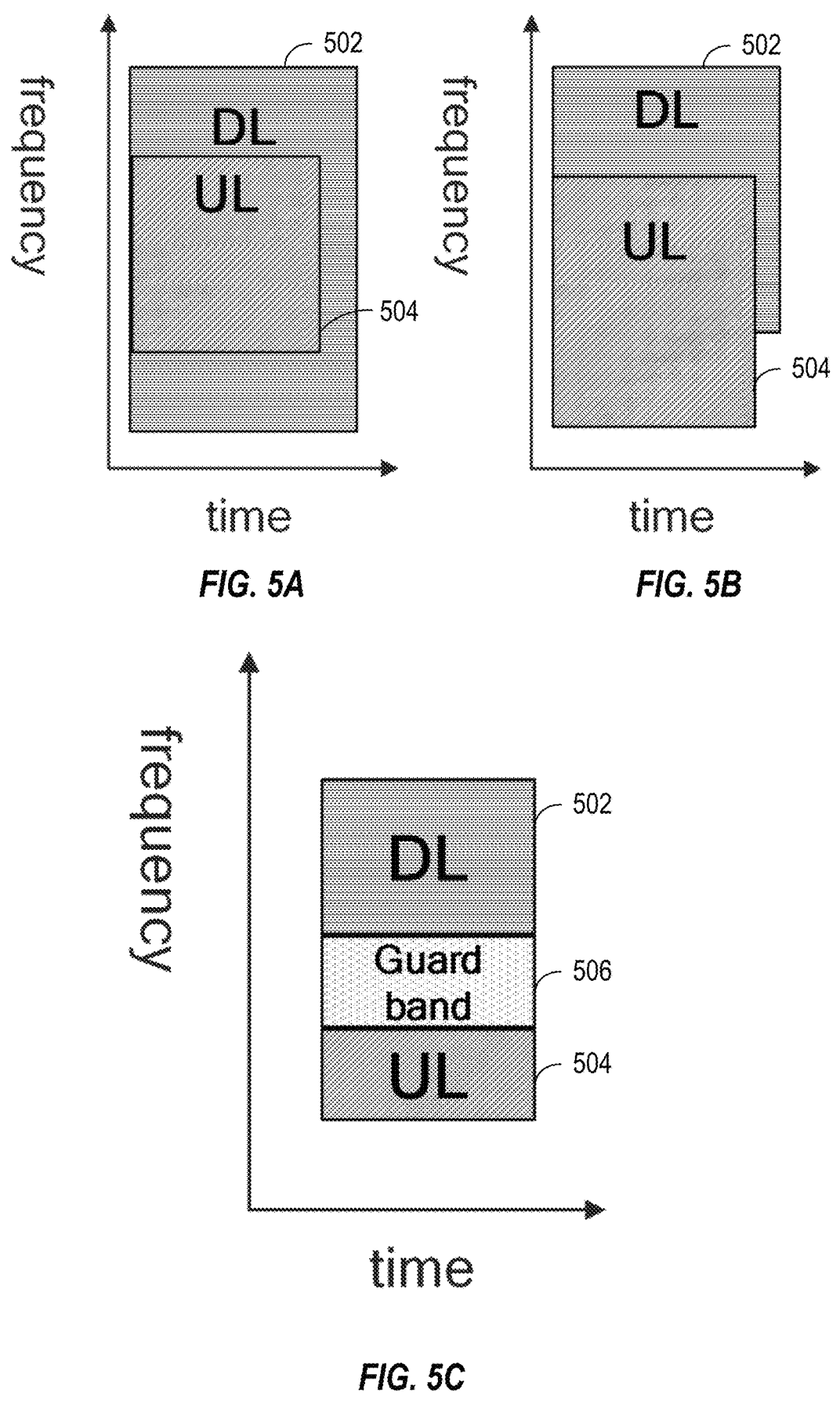

Examples of FD communication modes include in-band FD (IBFD) and sub-band FD. As illustrated in FIGS. 5A and 5B, with IBFD, a device may transmit and receive on the same time and frequency resources. In this case, the downlink (DL) 502 and uplink (UL) 504 shares the same IBFD time and frequency resources which may fully overlap (FIG. 5A) or partially overlap (FIG. 5B).

As shown in FIG. 5C, with SBFD (also referred to a flexible duplexing), a device may transmit and receive at the same time, but using different frequency resources. In this case, the DL resource may be separated from the UL resource, in frequency domain, by a guard band 506.

Interference to a UE and/or a network entity (e.g., a base station such as a gNB or node of a disaggregated base station) operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

As illustrated in FIG. 6A, a first scenario is when FD is enabled for a gNB (e.g., with non-overlapping UL/DL subbands) but disabled for each connected UE (which in turn may be enabled for half-duplex (HD) communication), a gNB communicates using FD capabilities. In this case, CLI between UEs, SI from the FD gNB, and CLI between the gNB and neighboring gNBs interferes with FD communication.

As illustrated in FIG. 6B, a second scenario is when FD is enabled for both a gNB and a FD UE/customer premise equipment (CPE) connected to the gNB, the gNB communicates with the FD UE using FD capabilities. If the gNB is connected to a HD UE alongside the FD UE, the gNB communicates with the HD UE. In this case, CLI between UEs, SI from the gNB and the FD UE, and CLI between the FD gNB and neighboring gNBs interferes with FD communication.

As illustrated in FIG. 6C, a third scenario is when FD is enabled for two gNBs (e.g., in a multiple TRP scenario) and enabled at one UE/CPE connected to the two gNBs. In this case, the two gNBs may communicate with the FD UE using FD capabilities. If one of the two gNBs is connected to an HD UE alongside the FD UE, the one gNB communicates with both the HD UE and the FD UE. In this case, CLI between UEs, SI from the FD UE, and CLI between the two gNBs may interfere with FD communication.

Figures 7A, 7B:
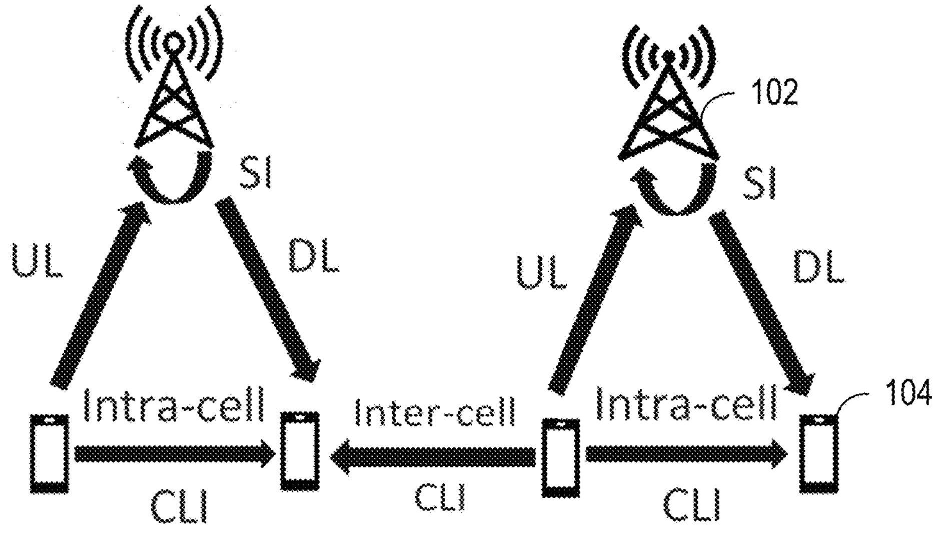
FIGS. 7A and 7B depict an example of inter-UE cross link interference (CLI).

FIG. 7A also illustrates various forms of interference for FD communications. As illustrated, if a UE 104 is operating in HD mode and a gNB 102 is operating in FD (mode) SBFD/IBFD, sources of interference at the UE include inter-cell interference from other gNBs, intra-cell CLI from UEs in the same cell, and inter-cell CLI from UEs in adjacent cells. Additionally, there may be self-interference for full-duplex UEs, particularly in SBFD slots that include both uplink subbands 754 and downlink subbands 752, as shown in FIG. 7B.

Figure 8:
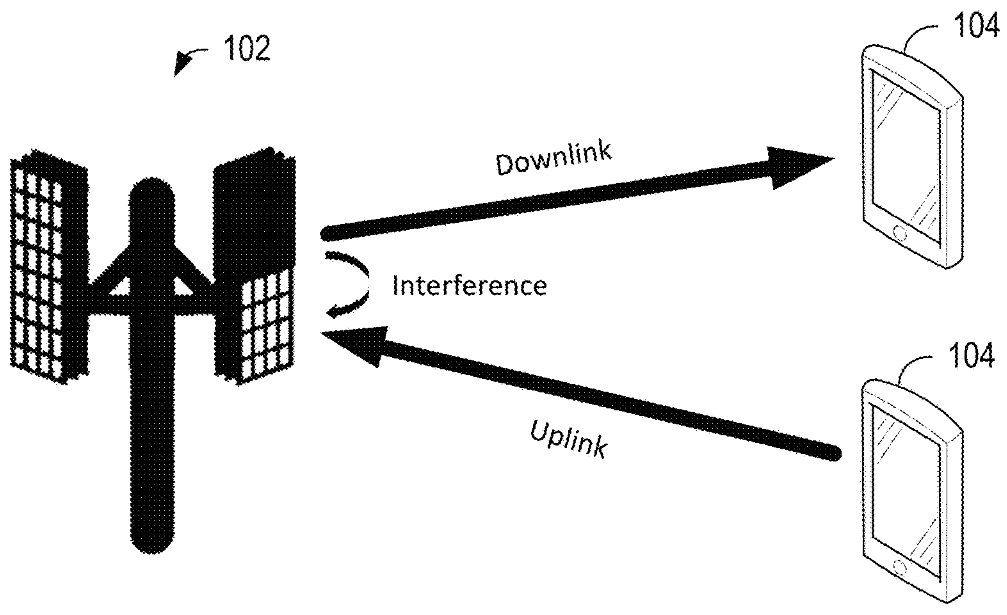
FIG. 8 depicts an example of an FD base station performing simultaneous transmission and reception.

As noted above, an FD enabled device is capable of bi-directional network data transmissions at the same time. FIG. 8 illustrates an example of an FD enabled base station (an FD gNB) performing simultaneous transmission and reception on a same slot. As shown, the FD gNB may simultaneously perform a downlink transmission and receive an uplink transmission. As illustrated, the downlink transmission may be intended for a first UE, and the uplink transmission may be received from a second UE. In some cases, the downlink transmission and uplink transmission may both be associated with the same UE (e.g., if the UE is an FD UE). The simultaneous transmission and reception in a same slot may cause interference, as illustrated.

Figure 9A:
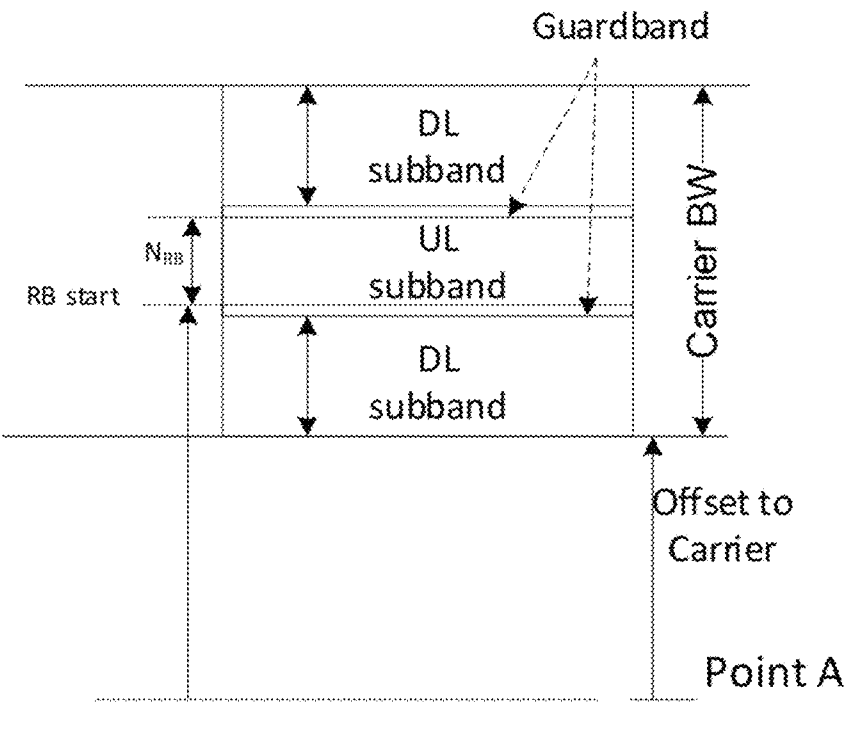
FIGS. 9A and 9B depict example uplink and downlink subbands for subband FD (SBFD) operations.
Figure 9B:
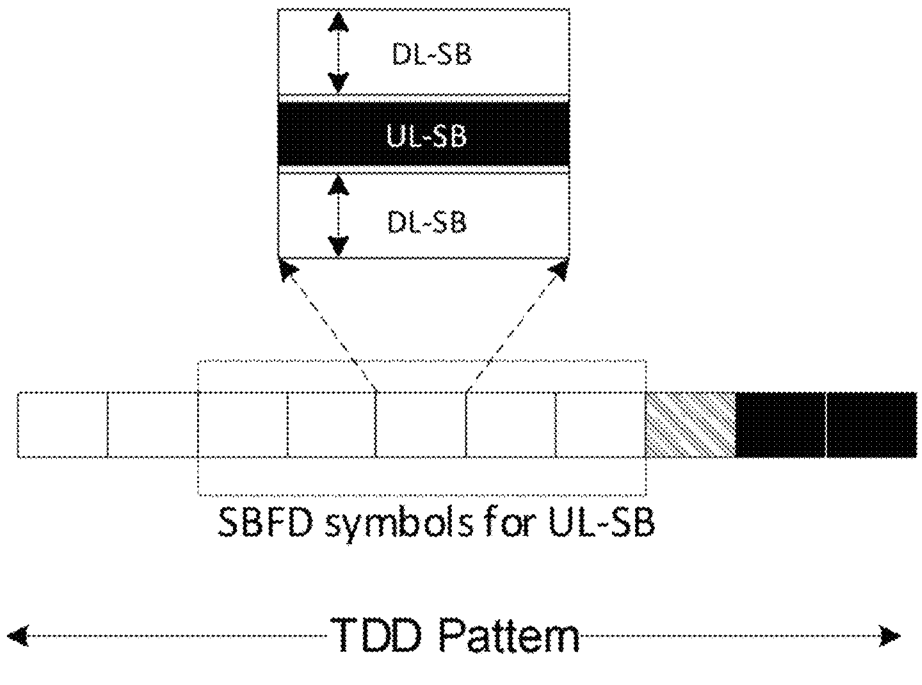

FIGS. 9A and 9B depict example uplink (UL) and downlink (DL) subbands for SBFD operations.

As illustrated in FIG. 9A, for example, UL and DL subbands may be allocated for SBFD operations within a carrier bandwidth (BW). As illustrated, for example, an UL subband allocation (e.g., and/or a DL subband allocation) may span $N_{RB}$ resource blocks (RBs). As noted above, and as illustrated, UL subbands and DL subbands may be separated by guard bands.

As illustrated in FIG. 9B, a time division duplexing (TDD) pattern may indicate a semi-static configuration of subband time locations for SBFD operation. In such cases, frequency locations of DL subband(s) may be explicitly configured with guardband(s), if any, implicitly derived as RBs which are not within UL subband or DL subband(s). In other cases, a number of RBs for guardband(s), if any, is explicitly configured. In such cases, DL subband(s) may be implicitly derived as RBs which are not within UL subband or guardband(s).

Aspects Related to Association of SBFD Configurations and BWPs

As noted above, SBFD operation may result in relatively high power consumption. A network entity may reduce its energy consumption by adapting cell bandwidth, reducing power (e.g., to reduce self-interference), changing antenna configurations (e.g., to reduce jamming), or even turning off SBFD mode.

Therefore, a network entity may benefit from having different SBFD configuration for the different gNB network energy savings (NES) modes. For example, a network entity may have different cell bandwidths (e.g. smaller bandwidth to improve energy savings) for different NES modes. UL/DL subband sizes may be different for the different BWPs (e.g. for all BWPs when cell-dependent or each BWP when BWP-dependent). For example, in some cases, a cell's bandwidth, a number of antennas, and/or transmit power may be adjusted for energy savings. In such cases, the interference suppression capability and the impacted bandwidths may be different based on the adjustments, and thus guard band size and DL/UL subbands configuration may be different. Alternatively, in some cases, a network entity may decide to turn off SBFD for some or all BWPs for energy savings.

As noted above, when a UE is indicated with one or more SBFD configurations, it may be unclear to the UE whether the SBFD configurations are BWP dependent or not (e.g., if the SBFD configurations are applicable to all UE BWPs or not). Further, if the UE is indicated with multiple SBFD configurations, the associations of the configurations with various BWPs may be unclear. Additionally, it may be unclear to the UE whether the SBFD configurations are serving-cell common or UE-dedicated and whether time and/or frequency configurations are cell-common or UE-dedicated.

Aspects of the present disclosure provide techniques for association of SBFD configurations and BWPs. Such associations may enable adaptation of SBFD operations/configurations, for example, by changing an SBFD configuration or turning ON/OFF an SBFD configuration in one or more BWPs (e.g., based on the associations).

Figure 10:
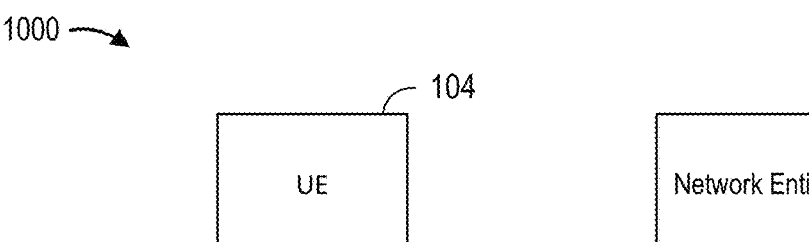
FIG. 10 depicts an example call flow diagram, in accordance with certain aspects of the present disclosure.

FIG. 10 depicts an example call flow diagram 1000 for flexible SBFD operation, in accordance with certain aspects of the present disclosure. In some aspects, the UE shown FIG. 10 may be an example of the UE 104 depicted and described with respect to FIGS. 1 and 3. Similarly, the network entity may be an example of the BS 102 (e.g., a gNB) depicted and described with respect to FIGS. 1 and 3, an access point (AP), or a disaggregated base station depicted and described with respect to FIG. 2.

As illustrated at 1002, the network entity may transmit signaling (e.g., an SBFD configuration or a BWP configuration) to the UE indicating one or more associations between one or more SBFD configurations and one or more BWPs. As will be described in greater detail below, the associations could be indicated as part of a BWP configuration or as part of an SBFD configuration.

As illustrated at 1004, the UE may determine whether one of the SBFD configurations is applicable to a first BWP (e.g., an active BWP) based on the associations.

As illustrated at 1006, the UE and the network entity may communicate on the first BWP in accordance with the determination.

In some aspects, a gNB (or other network entity) may configure one or more (e.g., semi-static) SBFD configurations (e.g., cell-common or UE-dedicated), and the gNB may enable/disable SBFD configurations/schemes for a UE's UL/DL BWPs.

In such aspects, for example, the gNB may configure an RRC parameter that indicates to the UE whether SBFD operations are applicable to that (e.g., active) BWP. There are various options for the structure of such an RRC parameter, for example, how it may be signaled and interpreted.

According to a first option (e.g., Option 1), the RRC parameter (e.g., configured as part of serving-cell configuration) may represent a bitmap or bitmask, where each bit corresponds to a BWP ID. For example, a first bit value (e.g., of 1) may indicate that SBFD schemes/operations are applicable to the BWP (e.g., the BWP associated with the BWP ID corresponding to the bit), whereas a second bit value (e.g., of 0) may indicate that SBFD schemes/operation are not applicable to the BWP.

In some aspects, if this RRC parameter is absent, and the UE receives the serving-cell SBFD configuration(s), then the configuration(s) may be applicable to all BWP except an initial BWP (e.g., SBFD operations may not begin until after RRC-connection). In some aspects, the gNB may change/update/enable/disable the RRC parameter via dynamic signaling (e.g., via a MAC-CE or DCI) to adapt the SBFD mode for each UE-BWP.

According to a second option (e.g., Option 2), the RRC parameter may be configured as part of (e.g., included in) a BWP configuration information element (IE). If configured (e.g., enabled), the UE may apply SBFD schemes to UE operation in that DL/UL BWP (e.g., the BWP indicated by the BWP configuration/IE). In some aspects, the gNB may update/enable/disable this RRC parameter by dynamic signaling (e.g., via MAC-CE or DCI) to adapt SBFD mode for each UE-BWP.

As noted above, in some aspects, the SBFD schemes may be adapted across BWPs. In some aspects, a gNB may want to disable SBFD operations for the UE BWP (e.g., and to fall back to time division duplexing (TDD) operations) for increased gNB power savings.

In some aspects, for example, a gNB may switch the UE to a different BWP that is not associated with the SBFD configuration (e.g., in order to disable SBFD operations). In some aspects, the gNB may take actions to release the RRC parameter or the serving-cell SBFD configurations (e.g., either as cell-common or UE-dedicated) by RRC reconfiguration or MAC-CE/DCI signaling. In some aspects, a gNB may indicate a new SBFD time-pattern indicating no SBFD symbols (e.g., a 'null' SBFD time-pattern). In some aspects, for Option 1 (RRC bitmask/bitmap for each BWP), gNB may perform RRC reconfiguration of the bitmap/bitmask (e.g. set all bit to zeros). In some aspects (e.g., for Option 1 described above), a gNB may release the RRC configuration.

FIG. 11 depicts an example BWP configuration 1100, in accordance with certain aspects of the present disclosure. BWP configuration 1100 may be an example of the BWP configuration described above with respect to Option 2.

For example, an RRC parameter (e.g., SBFD-schemes) 1104 may be included in BWP configuration 1100 to indicate applicability of configured SBFD schemes to UE operation in the BWP indicated by the BWP-Id 1102. As illustrated at 1104, the SBFD-schemes parameter is enabled, and thus, the BWP configuration 1100 indicates that the SBFD schemes are applicable to the BWP indicated by BWP-Id 1102.

In some aspects, when a gNB configures multiple (e.g., semi-static) SBFD configurations (e.g., cell-common or UE-dedicated), the gNB may associate each UL/DL BWP pair to one of the SBFD configurations.

FIGS. 12A and 12B depicts an example BWP configuration 1200 and SBFD configuration 1250 illustrating such an association, in accordance with certain aspects of the present disclosure.

For example, as illustrated, the BWP configuration 1200 of FIG. 12A may include a BWP-Id parameter 1202 identifying a BWP, and an SBFD-schemes parameter whose value may be set to an SBFD-configuration_id, identifying (and creating an association with) the SBFD configuration 1250 of FIG. 12B, which includes the same SBFD-configuration_id, illustrated at 1254.

In some aspects, the gNB may utilize a BWP switching framework to change the SBFD configurations. In some aspects, if an UL/DL BWP is not associated to any SBFD configuration, the UE may not apply SBFD schemes (e.g., no SBFD symbols in the TDD pattern) to its operation in that UL/DL BWP.

In some aspects, as noted above, SBFD configurations may be adapted/changed/updated. For example, motivated by gNB power savings, a gNB may adapt the cell-bandwidths or adapt a number of antennas or a power value (e.g., transmit power). In such aspects, the SBFD configuration (e.g., time and/or frequency configuration) may need to be adapted (e.g., disabled) for the UE's active BWP.

For example, in some aspects, RRC signaling (e.g. RRC reconfiguration) or a DCI/MAC-CE may be used by the gNB to release or update the SBFD configuration ID.

For example, in some aspects, a first SBFD configuration ID (e.g., SBFD-configuration_id1) may be updated (e.g., via RRC signaling or DCI/MAC-CE) to a second SBFD configuration ID (e.g., SBFD-configuration_id2) configuring different subbands in the time and/or frequency domain.

In some aspects, the RRC signaling or DCI/MAC-CE may be used to update a first SBFD configuration ID (e.g., SBFD-configuration_id1) to indicate that it has been released (e.g., disabling/releasing SBFD operation).

According to certain aspects, SBFD configuration(s) may be indicated by different parameters based on, for example, whether the SBFD configuration is cell-specific or UE-dedicated.

In some aspects, for example, if the SBFD configuration(s) are cell-specific, they may be indicated as part of a ServingCellConfigCommon configuration/IE or a ServingCellConfig configuration/IE.

In some aspects, for example, if the SBFD configuration(s) are UE-dedicated, they may be indicated as part of a ServingCellConfig configuration/IE or as part of the DL/UL BWP-dedicated configuration In some aspects, a gNB may decouple the time and frequency configurations of subbands. For example, in some aspects, frequency configurations may be cell specific (e.g., serving-cell common). In some aspects, frequency configurations may be associated with a single subband by default. In some aspects, multiple UL/DL subband frequency configurations may be configured, and a first one of the configurations may be used by default.

In some aspects, time locations may be UE-dedicated. For example, in some aspects, time locations may be the same across BWPs. In such aspects, a gNB may configure a single semi-static SBFD pattern.

In some aspects, different BWPs may have different SBFD time-pattern configurations. In such aspects, a gNB may configure multiple SBFD patterns and associate each BWP with one of the SBFD patterns. Additionally, in such aspects, the gNB may utilize BWP switching to change time locations of the SBFD symbols.

In some aspects, if a DL/UL BWP is not associated with an (e.g., semi-static) SBFD pattern, the UE may assume no SBFD symbols (e.g., a 'null' SBFD time-pattern).

Example Operations

Figure 13:
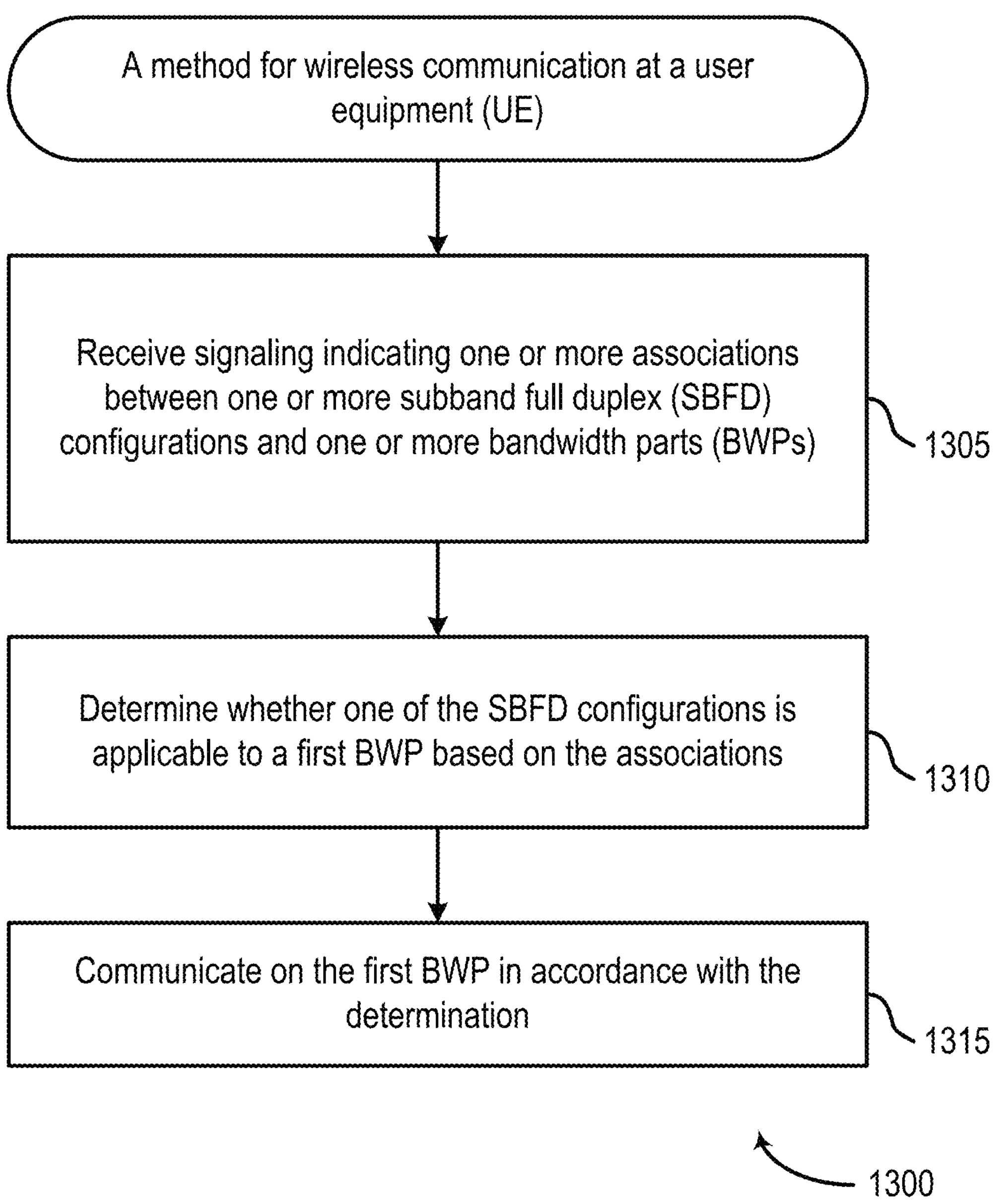
FIG. 13 depicts a method for wireless communications.

FIG. 13 shows an example of a method 1300 of wireless communication at a user equipment (UE), such as a UE 104 of FIGS. 1 and 3.

Method 1300 begins at step 1305 with receiving signaling indicating one or more associations between one or more subband full duplex (SBFD) configurations and one or more bandwidth parts (BWPs). In some cases, the operations of this step refer to, or may be performed by, circuitry for receiving and/or code for receiving as described with reference to FIG. 15.

Method 1300 then proceeds to step 1310 with determining whether one of the SBFD configurations is applicable to a first BWP based on the associations. In some cases, the operations of this step refer to, or may be performed by, circuitry for determining and/or code for determining as described with reference to FIG. 15.

Method 1300 then proceeds to step 1315 with communicating on the first BWP in accordance with the determination. In some cases, the operations of this step refer to, or may be performed by, circuitry for communicating and/or code for communicating as described with reference to FIG. 15.

In some aspects, the signaling comprises radio resource control (RRC) signaling indicating a higher-layer parameter with one or more bits, each bit indicating whether the one of the SBFD configurations is applicable to a BWP associated with that bit, and the determination is based on a bit in the parameter associated with the first BWP.

In some aspects, the parameter is indicated as part of an SBFD configuration of a serving cell configuration.

In some aspects, the parameter is indicated as part of a BWP configuration for the first BWP.

In some aspects, the method 1300 further includes receiving an update to the parameter, wherein the determination is based on the update. In some cases, the operations of this step refer to, or may be performed by, circuitry for receiving and/or code for receiving as described with reference to FIG. 15.

In some aspects, at least one of the parameter or the update is received via at least one of radio resource control (RRC) signaling, downlink control information (DCI) or a medium access control (MAC) control element (CE).

In some aspects, the method 1300 further includes receiving signaling indicating at least one of a switch to a second BWP that is not associated with an SBFD configuration, a release of the one or more SBFD configurations, or an updated SBFD time pattern indicating no SBFD symbols. In some cases, the operations of this step refer to, or may be performed by, circuitry for receiving and/or code for receiving as described with reference to FIG. 15.

In some aspects, the signaling indicates at least one association between an uplink and downlink BWP pair to an SBFD configuration ID.

In some aspects, the one or more SBFD configurations are cell-specific or UE-dedicated.

In some aspects, the method 1300 further includes receiving an indication of at least one time pattern indicating time locations for which the one or more SBFD configurations apply. In some cases, the operations of this step refer to, or may be performed by, circuitry for receiving and/or code for receiving as described with reference to FIG. 15.

In some aspects, the indication indicates at least one of: a single time pattern applicable to multiple BWPs, or multiple time patterns applicable to multiple BWPs.

Figure 15:
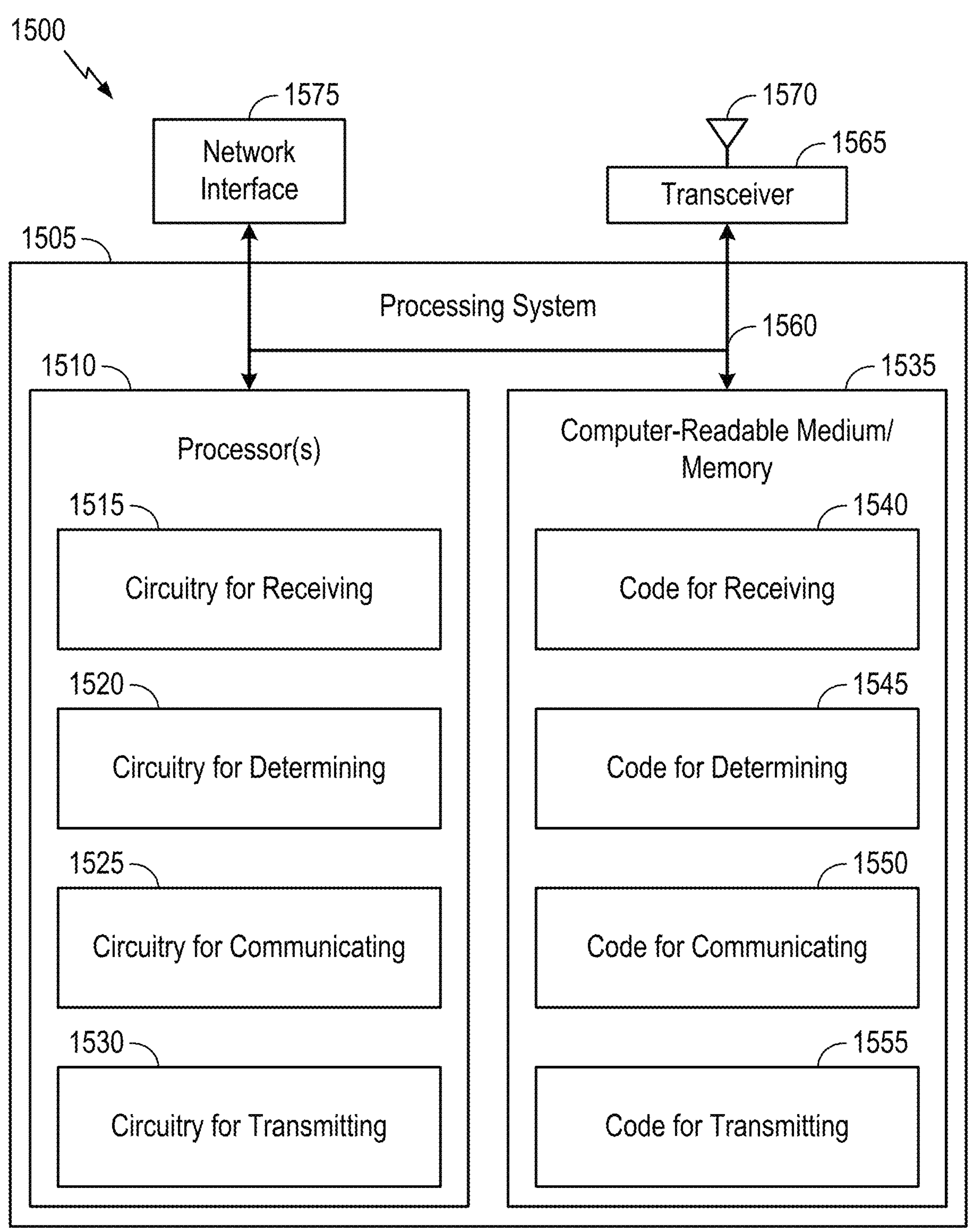
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Figure 14:
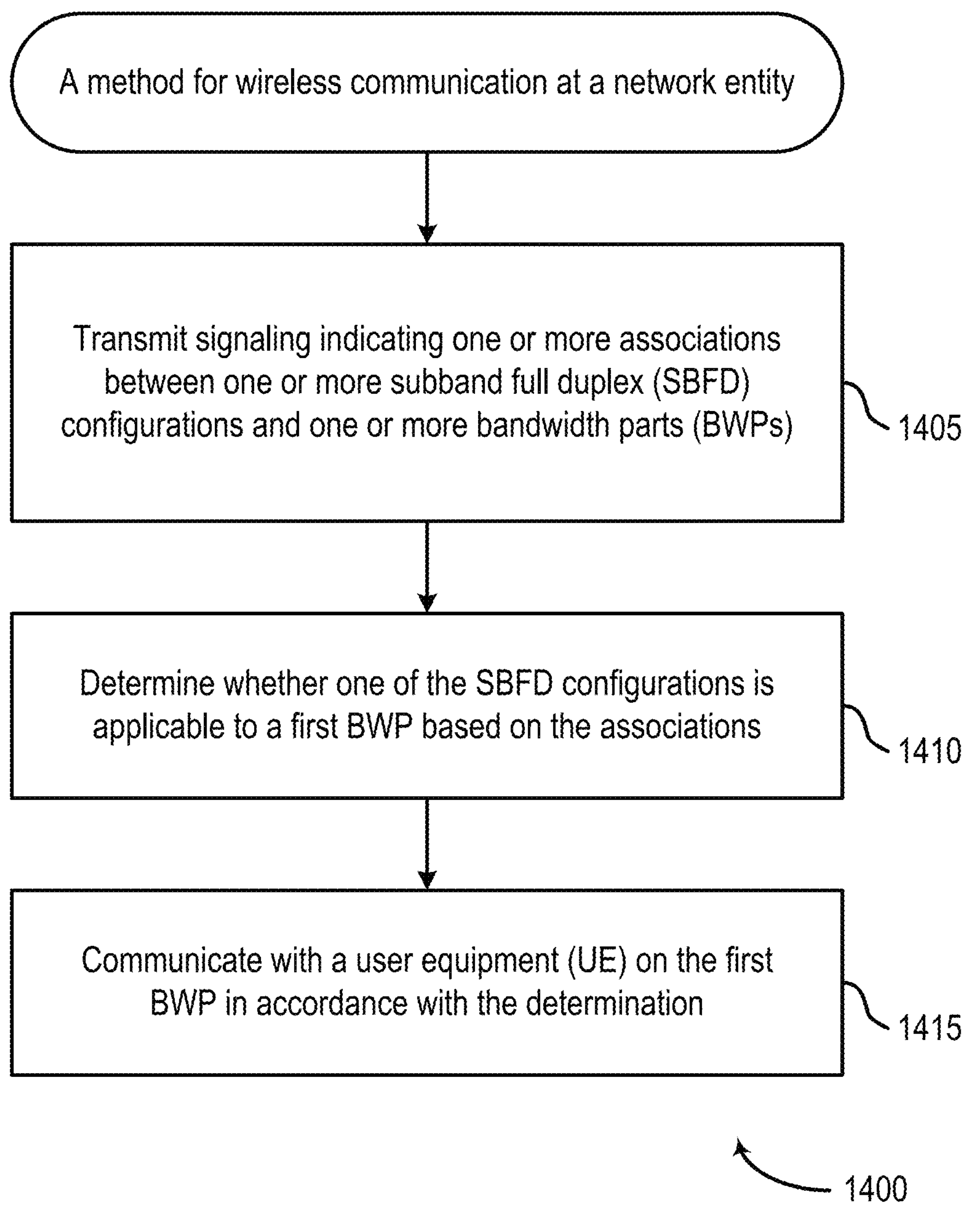
FIG. 14 depicts a method for wireless communications.

FIG. 14 shows an example of a method 1400 of wireless communication at a network entity, such as a BS 102 of FIGS. 1 and 3, or a disaggregated base station as discussed with respect to FIG. 2.

Method 1400 begins at step 1405 with transmitting signaling indicating one or more associations between one or more subband full duplex (SBFD) configurations and one or more bandwidth parts (BWPs). In some cases, the operations of this step refer to, or may be performed by, circuitry for transmitting and/or code for transmitting as described with reference to FIG. 15.

Method 1400 then proceeds to step 1410 with determining whether one of the SBFD configurations is applicable to a first BWP based on the associations. In some cases, the operations of this step refer to, or may be performed by, circuitry for determining and/or code for determining as described with reference to FIG. 15.

Method 1400 then proceeds to step 1415 with communicating with a user equipment (UE) on the first BWP in accordance with the determination. In some cases, the operations of this step refer to, or may be performed by, circuitry for communicating and/or code for communicating as described with reference to FIG. 15.

In some aspects, the signaling comprises radio resource control (RRC) signaling indicating a higher-layer parameter with one or more bits, each bit indicating whether the one of the SBFD configurations is applicable to a BWP associated with that bit, and the determination is based on a bit in the parameter associated with the first BWP.

In some aspects, the parameter is indicated as part of an SBFD configuration of a serving cell configuration.

In some aspects, the parameter is indicated as part of a BWP configuration for the first BWP.

In some aspects, the method 1400 further includes transmitting an update to the parameter, wherein the determination is based on the update. In some cases, the operations of this step refer to, or may be performed by, circuitry for transmitting and/or code for transmitting as described with reference to FIG. 15.

In some aspects, at least one of the parameter or the update is received via at least one of radio resource control (RRC) signaling, downlink control information (DCI) or a medium access control (MAC) control element (CE).

In some aspects, the method 1400 further includes transmitting signaling indicating at least one of a switch to a second BWP that is not associated with an SBFD configuration, a release of the one or more SBFD configurations, or an updated SBFD time pattern indicating no SBFD symbols. In some cases, the operations of this step refer to, or may be performed by, circuitry for transmitting and/or code for transmitting as described with reference to FIG. 15.

In some aspects, the signaling indicates at least one association between an uplink and downlink BWP pair to an SBFD configuration ID.

In some aspects, the one or more SBFD configurations are cell-specific or UE-dedicated.

In some aspects, the method 1400 further includes transmitting an indication of at least one time pattern indicating time locations for which the one or more SBFD configurations apply. In some cases, the operations of this step refer to, or may be performed by, circuitry for transmitting and/or code for transmitting as described with reference to FIG. 15.

In some aspects, the indication indicates at least one of: a single time pattern applicable to multiple BWPs, or multiple time patterns applicable to multiple BWPs.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device(s)

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1565 (e.g., a transmitter and/or a receiver). In some aspects (e.g., when communications device 1500 is a network entity), processing system 1505 may be coupled to a network interface 1575 that is configured to obtain and send signals for the communications device 1500 via communication link(s), such as a backhaul link, midhaul link, and/or fronthaul link as described herein, such as with respect to FIG. 2. The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1300 described with respect to FIG. 13, or any aspect related to it; and the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for receiving 1540, code for determining 1545, code for communicating 1550, and code for transmitting 1555. Processing of the code for receiving 1540, code for determining 1545, code for communicating 1550, and code for transmitting 1555 may cause the communications device 1500 to perform the method 1300 described with respect to FIG. 13, or any aspect related to it; and the method 1400 described with respect to FIG. 14, or any aspect related to it.

The one or more processors 1510 include circuitry configured to implement (e.g., execute) the code stored in the computer-readable medium/memory 1535, including circuitry for receiving 1515, circuitry for determining 1520, circuitry for communicating 1525, and circuitry for transmitting 1530. Processing with circuitry for receiving 1515, circuitry for determining 1520, circuitry for communicating 1525, and circuitry for transmitting 1530 may cause the communications device 1500 to perform the method 1300 described with respect to FIG. 13, or any aspect related to it; and the method 1400 described with respect to FIG. 14, or any aspect related to it.

Various components of the communications device 1500 may provide means for performing the method 1300 described with respect to FIG. 13, or any aspect related to it; and the method 1400 described with respect to FIG. 14, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15.

Example Clauses

Implementation examples are described in the following numbered clauses:

Clause 1: A method for wireless communication at a user equipment (UE), comprising: receiving signaling indicating one or more associations between one or more subband full duplex (SBFD) configurations and one or more bandwidth parts (BWPs); determining whether one of the SBFD configurations is applicable to a first BWP based on the associations; and communicating on the first BWP in accordance with the determination.

Clause 2: The method of Clause 1, wherein: the signaling comprises radio resource control (RRC) signaling indicating a higher-layer parameter with one or more bits, each bit indicating whether the one of the SBFD configurations is applicable to a BWP associated with that bit, and the determination is based on a bit in the parameter associated with the first BWP.

Clause 3: The method of Clause 2, wherein the parameter is indicated as part of an SBFD configuration of a serving cell configuration.

Clause 4: The method of Clause 2, wherein the parameter is indicated as part of a BWP configuration for the first BWP.

Clause 5: The method of Clause 2, further comprising receiving an update to the parameter, wherein the determination is based on the update.

Clause 6: The method of Clause 5, wherein at least one of the parameter or the update is received via at least one of radio resource control (RRC) signaling, downlink control information (DCI) or a medium access control (MAC) control element (CE).

Clause 7: The method of any one of Clauses 1-6, further comprising receiving signaling indicating at least one of a switch to a second BWP that is not associated with an SBFD configuration, a release of the one or more SBFD configurations, or an updated SBFD time pattern indicating no SBFD symbols.

Clause 8: The method of any one of Clauses 1-7, wherein the signaling indicates at least one association between an uplink and downlink BWP pair to an SBFD configuration ID.

Clause 9: The method of any one of Clauses 1-8, wherein the one or more SBFD configurations are cell-specific or UE-dedicated.

Clause 10: The method of any one of Clauses 1-9, further comprising receiving an indication of at least one time pattern indicating time locations for which the one or more SBFD configurations apply.

Clause 11: The method of Clause 10, wherein the indication indicates at least one of: a single time pattern applicable to multiple BWPs, or multiple time patterns applicable to multiple BWPs.

Clause 12: A method for wireless communication at a network entity, comprising: transmitting signaling indicating one or more associations between one or more subband full duplex (SBFD) configurations and one or more bandwidth parts (BWPs); determining whether one of the SBFD configurations is applicable to a first BWP based on the associations; and communicating with a user equipment (UE) on the first BWP in accordance with the determination.

Clause 13: The method of Clause 12, wherein: the signaling comprises radio resource control (RRC) signaling indicating a higher-layer parameter with one or more bits, each bit indicating whether the one of the SBFD configurations is applicable to a BWP associated with that bit, and the determination is based on a bit in the parameter associated with the first BWP.

Clause 14: The method of Clause 13, wherein the parameter is indicated as part of an SBFD configuration of a serving cell configuration.

Clause 15: The method of Clause 13, wherein the parameter is indicated as part of a BWP configuration for the first BWP.

Clause 16: The method of Clause 13, further comprising transmitting an update to the parameter, wherein the determination is based on the update.

Clause 17: The method of Clause 16, wherein at least one of the parameter or the update is received via at least one of radio resource control (RRC) signaling, downlink control information (DCI) or a medium access control (MAC) control element (CE).

Clause 18: The method of any one of Clauses 12-17, further comprising transmitting signaling indicating at least one of a switch to a second BWP that is not associated with an SBFD configuration, a release of the one or more SBFD configurations, or an updated SBFD time pattern indicating no SBFD symbols.

Clause 19: The method of any one of Clauses 12-18, wherein the signaling indicates at least one association between an uplink and downlink BWP pair to an SBFD configuration ID.

Clause 20: The method of any one of Clauses 12-19, wherein the one or more SBFD configurations are cell-specific or UE-dedicated.

Clause 21: The method of any one of Clauses 12-20, further comprising transmitting an indication of at least one time pattern indicating time locations for which the one or more SBFD configurations apply.

Clause 22: The method of Clause 21, wherein the indication indicates at least one of: a single time pattern applicable to multiple BWPs, or multiple time patterns applicable to multiple BWPs.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, “a processor,” “at least one processor” or “one or more processors” generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, “a memory,” “at least one memory” or “one or more memories” generally refers to a single memory configured to store data and/or instructions, multiple memories configured to collectively store data and/or instructions.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for”. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE), comprising:

receiving signaling indicating one or more associations between one or more subband full duplex (SBFD) configurations and one or more bandwidth parts (BWPs), wherein:

the signaling comprises radio resource control (RRC) signaling indicating a higher-layer parameter with one or more bits, and each bit indicates whether one of the one or more SBFD configurations is applicable to a BWP associated with that bit;

determining whether one of the one or more SBFD configurations is applicable to a first BWP based on the one or more associations, the determination based on a bit in the higher-layer parameter associated with the first BWP; and communicating on the first BWP in accordance with the determination.

2. The method of claim 1, wherein the higher-layer parameter is indicated as part of an SBFD configuration of a serving cell configuration.

3. The method of claim 1, wherein the higher-layer parameter is indicated as part of a BWP configuration for the first BWP.

4. The method of claim 1, further comprising receiving an update to the higher-layer parameter, wherein the determination is based on the update.

5. The method of claim 1, wherein at least one of the higher-layer parameter or the update is received via at least one of RRC signaling, downlink control information (DCI) or a medium access control (MAC) control element (CE).

6. The method of claim 1, further comprising receiving signaling indicating at least one of a switch to a second BWP that is not associated with an SBFD configuration, a release of the one or more SBFD configurations, or an updated SBFD time pattern indicating no SBFD symbols.

7. The method of claim 1, wherein the signaling indicates at least one association between an uplink and downlink BWP pair to an SBFD configuration ID.

8. The method of claim 1, wherein the one or more SBFD configurations are cell-specific or UE-dedicated.

9. The method of claim 1, further comprising receiving an indication of at least one time pattern indicating time locations for which the one or more SBFD configurations apply.

10. The method of claim 9, wherein the indication indicates at least one of: a single time pattern applicable to multiple BWPs, or multiple time patterns applicable to multiple BWPs.

11. A method for wireless communication at a network entity, comprising:

transmitting signaling indicating one or more associations between one or more subband full duplex (SBFD) configurations and one or more bandwidth parts (BWPs), wherein:

the signaling comprises radio resource control (RRC) signaling indicating a higher-layer parameter with one or more bits, and each bit indicates whether one of the one or more SBFD configurations is applicable to a BWP associated with that bit;

determining whether one of the one or more SBFD configurations is applicable to a first BWP based on the one or more associations, the determination based on a bit in the higher-layer parameter associated with the first BWP; and communicating with a user equipment (UE) on the first BWP in accordance with the determination.

12. The method of claim 11, wherein the higher-layer parameter is indicated as part of an SBFD configuration of a serving cell configuration.

13. The method of claim 11, wherein the higher-layer parameter is indicated as part of a BWP configuration for the first BWP.

14. The method of claim 11, further comprising transmitting an update to the higher-layer parameter, wherein the determination is based on the update.

15. The method of claim 14, wherein at least one of the higher-layer parameter or the update is received via at least one of RRC signaling, downlink control information (DCI) or a medium access control (MAC) control element (CE).

16. The method of claim 11, further comprising transmitting signaling indicating at least one of a switch to a second BWP that is not associated with an SBFD configuration, a release of the one or more SBFD configurations, or an updated SBFD time pattern indicating no SBFD symbols.

17. The method of claim 11, wherein the signaling indicates at least one association between an uplink and downlink BWP pair to an SBFD configuration ID.

18. The method of claim 11, wherein the one or more SBFD configurations are cell-specific or UE-dedicated.

19. The method of claim 11, further comprising transmitting an indication of at least one time pattern indicating time locations for which the one or more SBFD configurations apply.

20. The method of claim 19, wherein the indication indicates at least one of: a single time pattern applicable to multiple BWPs, or multiple time patterns applicable to multiple BWPs.

* * * * *